United States Patent [19]

Magnuson

[11] Patent Number: 4,971,341

[45] Date of Patent: Nov. 20, 1990

[54] WHEELCHAIR RETAINER COUPLING

[75] Inventor: Richard C. Magnuson, Kentwood, Mich.

[73] Assignee: American Seating Company, Grand Rapids, Mich.

[21] Appl. No.: 434,277

[22] Filed: Nov. 13, 1989

[51] Int. Cl.[5] .................... B60P 7/00

[52] U.S. Cl. .................... 280/1; 188/2 F; 280/304.1

[58] Field of Search .................... 188/2 F, 32, 76; 280/1, 280/304.1; 116/200, 306, 325

[56] References Cited

U.S. PATENT DOCUMENTS 4,113,270 9/1978 Barecki .................... 280/1

4,221,396 9/1980 Kehl .................... 280/1

4,771,867 9/1988 Fernandes .................... 188/32

*Primary Examiner*—Duane A. Reger

*Attorney, Agent, or Firm*—Waters, Morse & Harrington

[57] ABSTRACT

A U-shaped frame has opposite pivoted jaws adapted to move to and from a position closing the frame gap. A releasable locking member is pivoted to the frame in half-bearings, and is held in place by a cover plate that similarly retains the journals of an actuator plate responsible for closing the jaws around an entered wheel. The locking member is rotated out of locking position by forces on a handle that cause the chair to be pushed out of the retainer coupling. Placement of the locking member in the release position causes warning projections to appear above the housing, and these retract into the housing when the unit is in locked condition.

11 Claims, 6 Drawing Sheets

WHEELCHAIR RETAINER COUPLING

BACKGROUND OF THE INVENTION

Handicapped or injured persons confined to wheelchairs are particularly vulnerable when riding in public transportation vehicles. Starting, stopping, and sharp turns induce inertial and centrifugal forces that can send the wheelchair and its occupant careening around the adjacent space, with obvious risk of injury. The occupant may well have limited use of his arms to protect himself. To remove this danger, coupling devices have been used to releasably secure the wheelchair in place. These retainers are secured to the vehicle structure, and may be adapted to grasp the rim and tire of a wheelchair that is backed into engagement with the device. These couplings are presently available, but some design problems have remained. This invention presents an improvement on the Barecki Patent No. 4,113,270 with regard to cost and reliability.

A clear indication of the unlocked condition of the coupling has not heretofore been provided. It must be kept in mind that the position of the jaws may well be obscured, as the coupling is normally behind the occupant of the chair. It also may not be clearly visible because of the presence of the wheel rim, tire, and the adjacent vehicle structure. Some previous coupling devices have incidentally involved locking systems in which a locking component moves into view when the locking action is completed, but this is not the situation that causes the most trouble. The occupant, or the vehicle attendant, should have a very clear signal presented to him when the locking action has not been completed. Regrettable accidents have taken place when a superficial glance at the coupling device suggests that the chair is firmly secured, when later it appears that this is not the case. Released from the grasp of the coupling, the occupant is at the mercy of whatever may happen to him. The emergence of part of a locking pin in the fully locked condition of the device, as is characteristic of the device described in the Downing, et al, Patent Number 4,062,209, does not appear to be adequate. The absence of such a projection does not apparently call sufficient attention to the danger that is present.

Another problem has been in the position of the unlocking actuator that the occupant or a vehicle attendant must operate in order to release the wheelchair. The direction of the force necessary to effect this release is important. An occupant with at least some use of his arms should be able to release his chair, and thus be less dependent on the help of others. It is very advantageous to have the force necessary to operate the release take place in a direction that will move the chair out of the grasp of the coupling device. Escape from the device therefore can be effected as a single operation, and with one hand. When the unlocking force is in a different direction from that which will move the vehicle away from the device, such movement must be generated at the same time that the device is being unlocked. This produces a two-handed operation that frequently requires the assistance of others. Refinements have also been needed to provide a sturdy structure that can be manufactured and installed easily, with consequent economy.

SUMMARY OF THE INVENTION

This wheelchair retainer coupling has an integral U-shaped frame defining an interior space receiving a pair of opposite pivoted jaws. The frame configuration provides access for the installation of the jaws and a biasing spring tending to swing the jaws into open position. An actuator plate moves the jaws to a position closing the gap defined by the U-shaped frame. The device has housing sections secured to the legs of the U-shaped frame to define a space receiving a locking member that pivots to move offset ends to and from positions intercepting the jaws to hold them together until a release lever is actuated. This locking member also has a U-shaped configuration, with the back portion received in half-bearings in the frame, and held in place by a cover plate that also similarly retains the pivoted actuator plate that bears against portions of the jaws to close them in response to the entrance of a wheelchair tire into the coupling. Pushing on a handle extending upwardly from the locking member pivots it in its bearings to raise the offset ends out of locking position, permitting the biasing spring to open them. This force is applied rearwardly with respect to the occupant of the wheelchair, and thus tends to push the wheelchair free from the grasp of the coupling. The locking member is biased to a locking position by a leaf spring system mounted on the same cover plate that holds this component in the half bearings of the frame. As the locking member rocks to release position, preferably colored indicia extend through an opening in the housing into clear view to indicate the fact that the wheelchair is no longer positively secured.

DESCRIPTION OF THE PREFERRED EMBODIMENT

Figure 1:
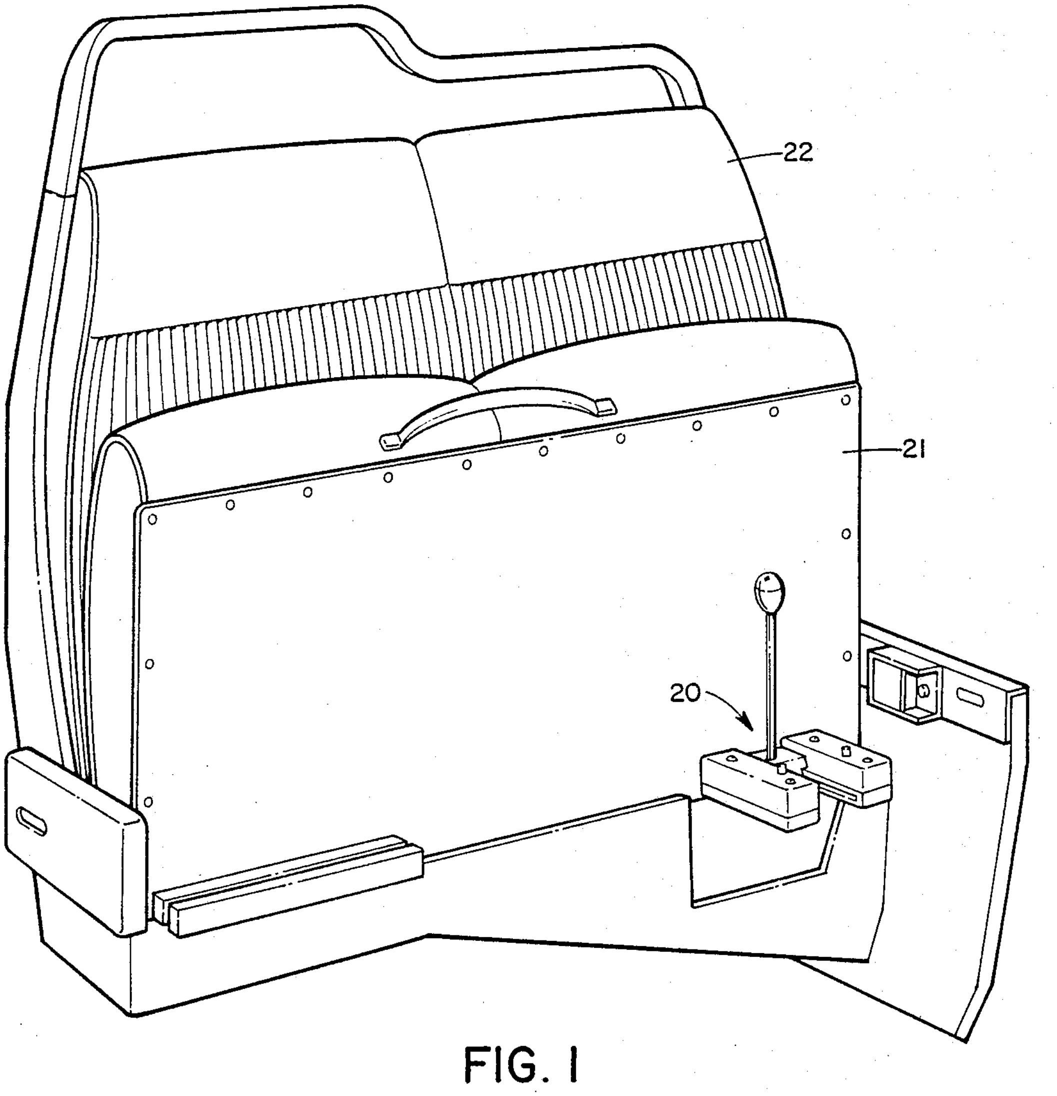
FIG. 1 is a perspective view showing the installation of a device embodying the present invention on a typical transportation vehicle, where a seat has been tipped up to provide space for the wheelchair. The device is shown mounted on the structure of the underside of the seat.
Figure 2:
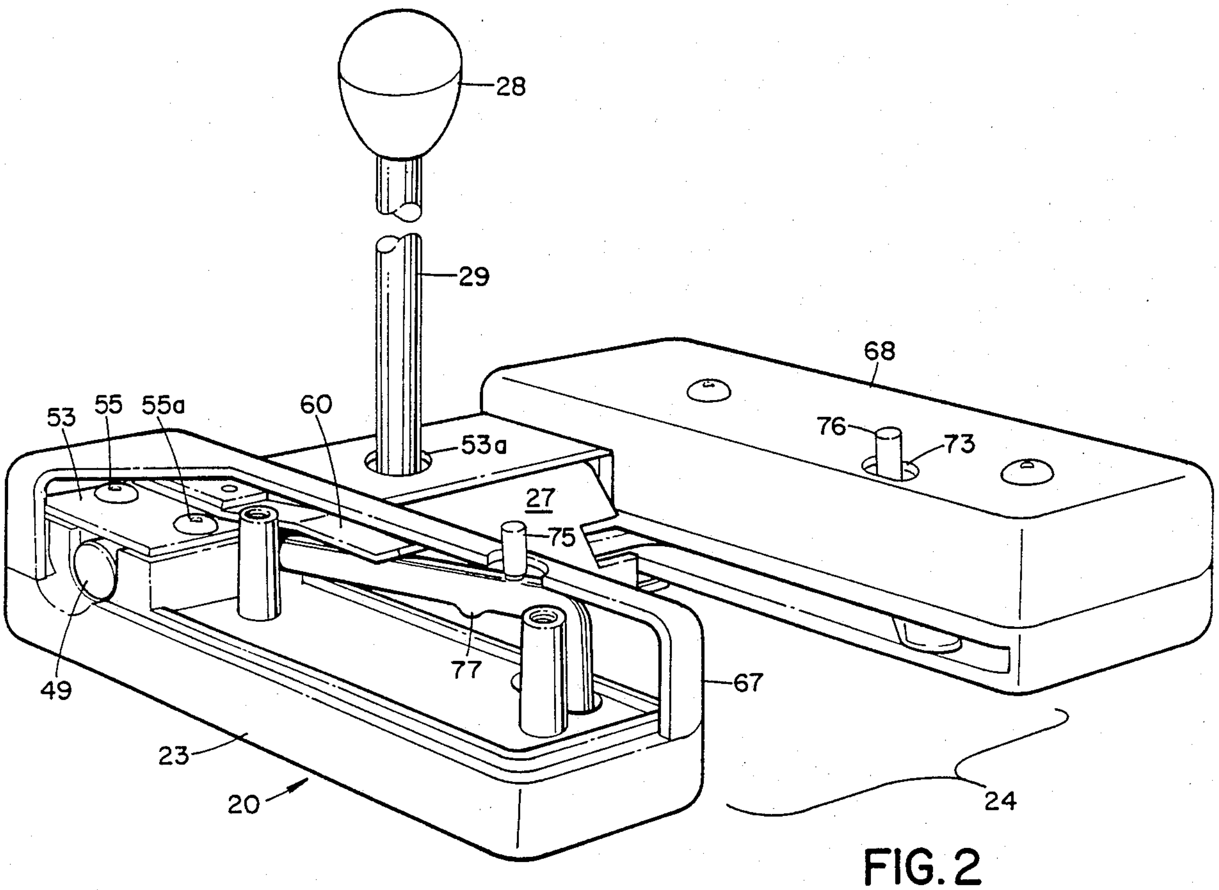
FIG. 2 is a perspective view showing the device in the unlocked condition, with a portion of one of the housing sections broken away to show the interior of the device.
Figure 3:
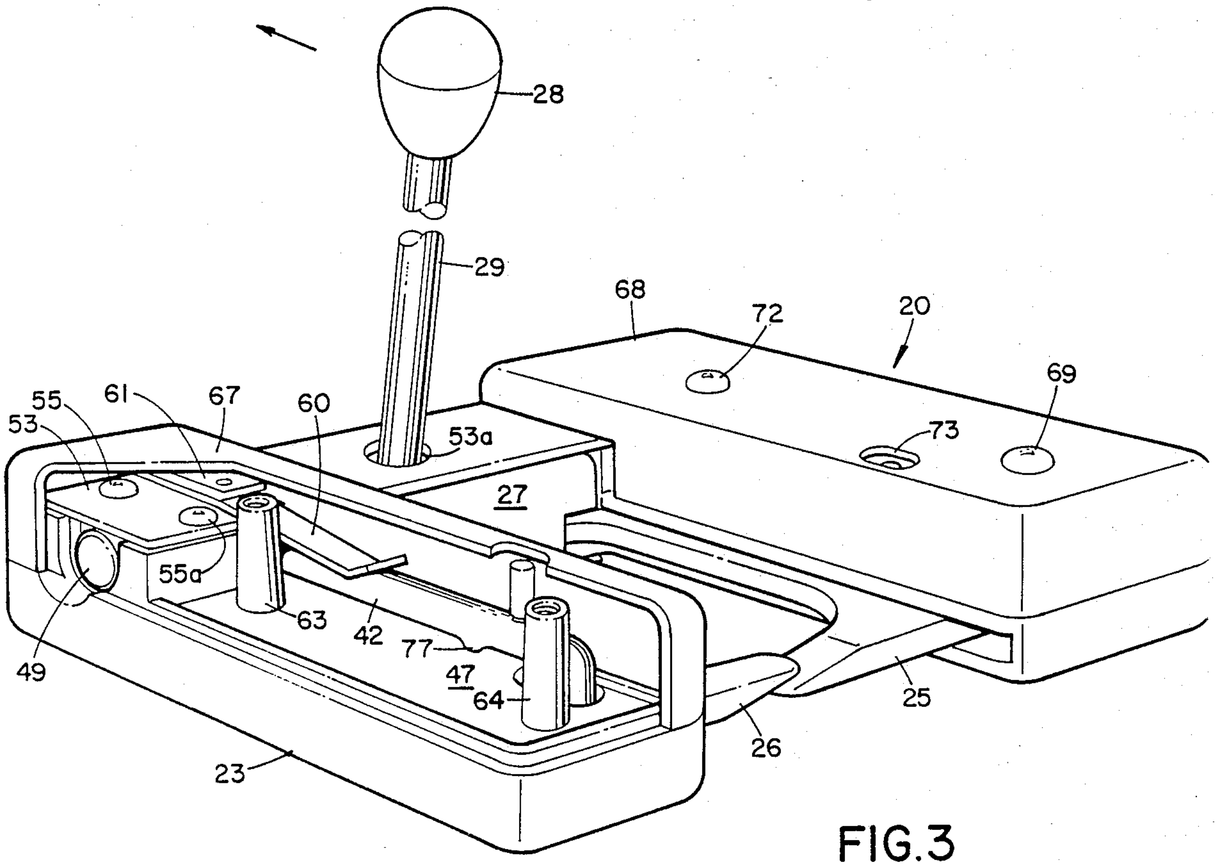
FIG. 3 is a perspective view similar to FIG. 2, showing the locked condition of the device.
Figure 4:
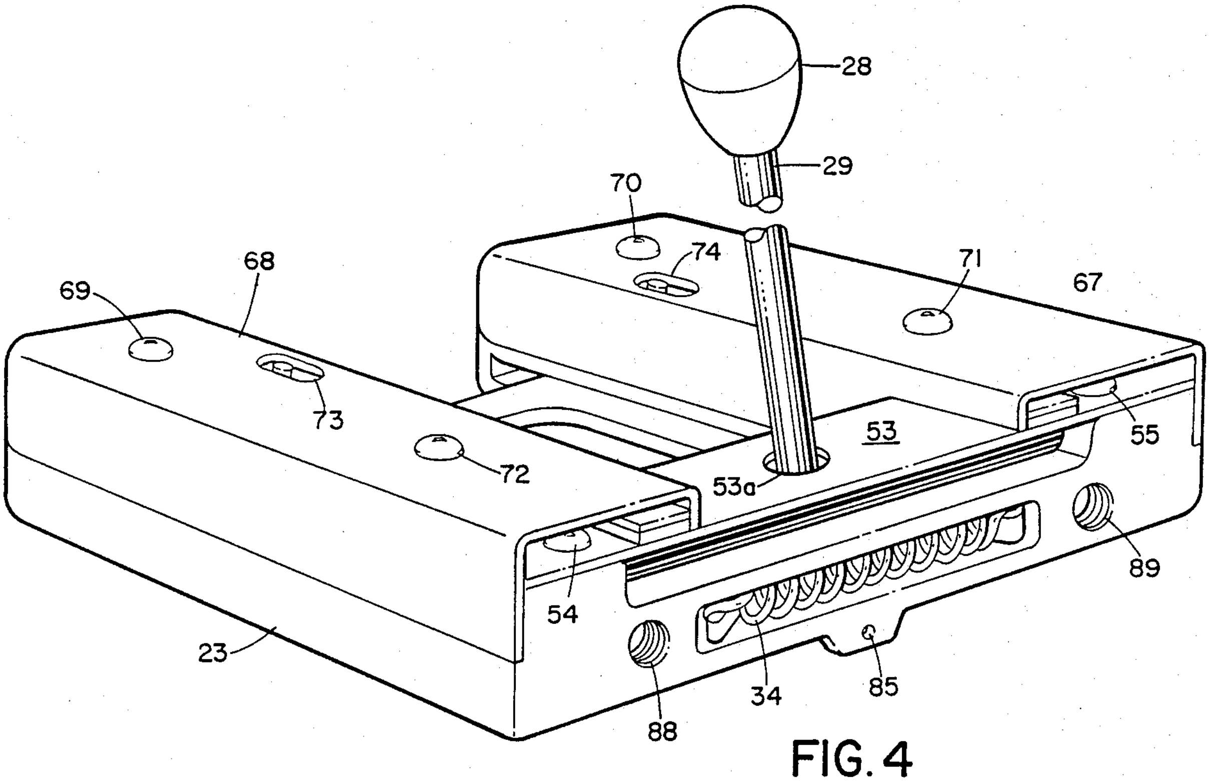
FIG. 4 is a perspective view from the rear of the device.
Figure 11:
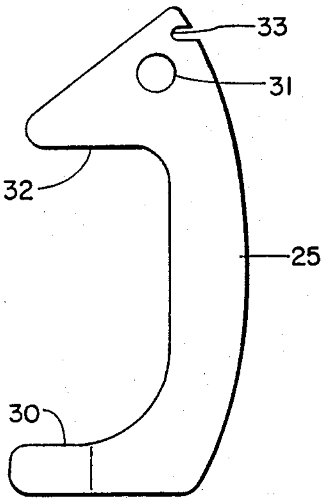
FIG. 11 is a plan view of one of the jaws of the device.
Figure 12:
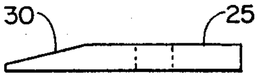
FIG. 12 is a bottom view with respect to FIG. 11.
Figure 13:
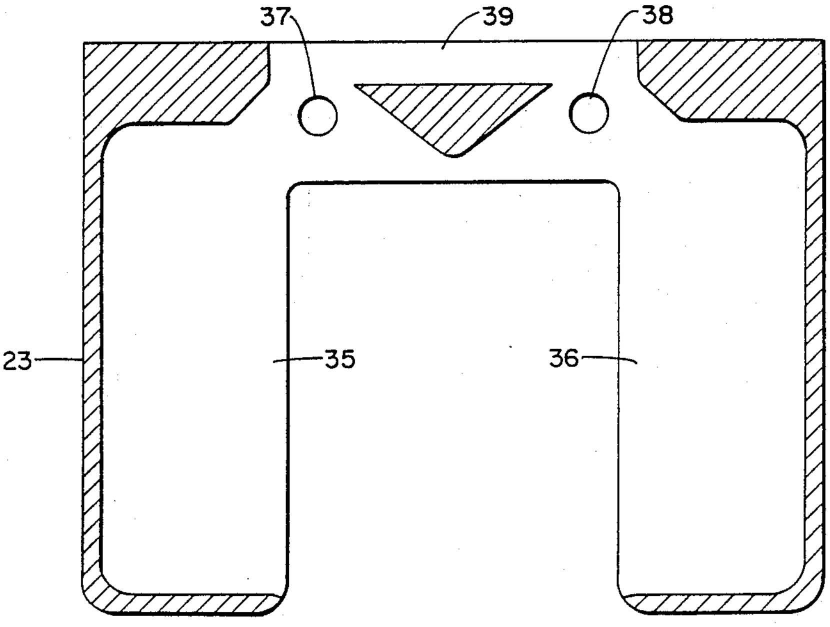
FIG. 13 is a section on a horizontal plane through the frame of the device, illustrating the space occupied by the pivoted jaws.

Referring to FIG. 1 of the drawings, the device generally indicated at 20 is shown mounted on the underside of the folding seat 21. The seat has been tipped up against the back 22 to provide room for the arrival of a wheelchair. Referring to FIGS. 2 and 3, the device has a U-shaped frame 23 in which the legs of the frame define a gap 24 that can be closed by the jaws 25 and 26 in response to the entrance of the tire and rim of a wheelchair into the gap 24 to the point of contact with the actuating plate 27. Release of the wheelchair from the grasp of the coupling is effected by pushing the knob 28 at the end of the handle arm 29 in the direction of the arrow in FIG. 3. The device then springs to the FIG. 2 position. While still in the locked position of FIG. 3, the jaws 25 and 26 overlap at their extremities —preferably by perhaps a quarter to a half an inch —, and are spaced where they are overlapped to permit the escape of the spokes of the wheel of the wheelchair. The spokes therefore have a much reduced tendency to block the movement of the jaws to the closed position of FIG. 3. The overlap permits the jaws to fully embrace the periphery of the wheel to reduce any tendency of the wheel to force the jaws open. Referring to FIGS. 11 and 12, the overlapped portions of the jaws are beveled as shown at 30 to provide the spaced relationship of essentially co-planar jaws. Both jaws have the same configuration, and have a hole 31 for receiving a pivot pin. A lever portion 32 is provided for cooperation with the actuator plate 27 so that movement of the actuator plate in response to the presence of the wheelchair will cause the plate to bear against the lever portion 32 and swing the jaws to the locked position of FIG. 3. The jaws also have a notch 33 for receiving the end loops of a tension spring 34 visible most clearly at the rear of the device, as shown in FIG. 4. This spring tends to bias the jaws to the unlocked position of FIG. 2. The jaws move within the spaces 35 and 36 of the housing (refer to FIG. 13), which also has holes 37 and 38 for receiving the jaw pivot pins. The spring 34 is received in the opening indicated at 39.

The jaws are held in the locked position of FIG. 3 by a generally U-shaped locking member 40 having legs 41 and 42 provided with offset ends 43 and 44, respectively, that move through the openings 45 and 46 in the partitions 47 and 48 of the frame. In the position of the device shown in FIGS. 5 and 6, the offset ends 43 and 44 block the movement of the jaws to prevent swinging outward, and thus lock them in the closed position of FIG. 2.

Figure 5:
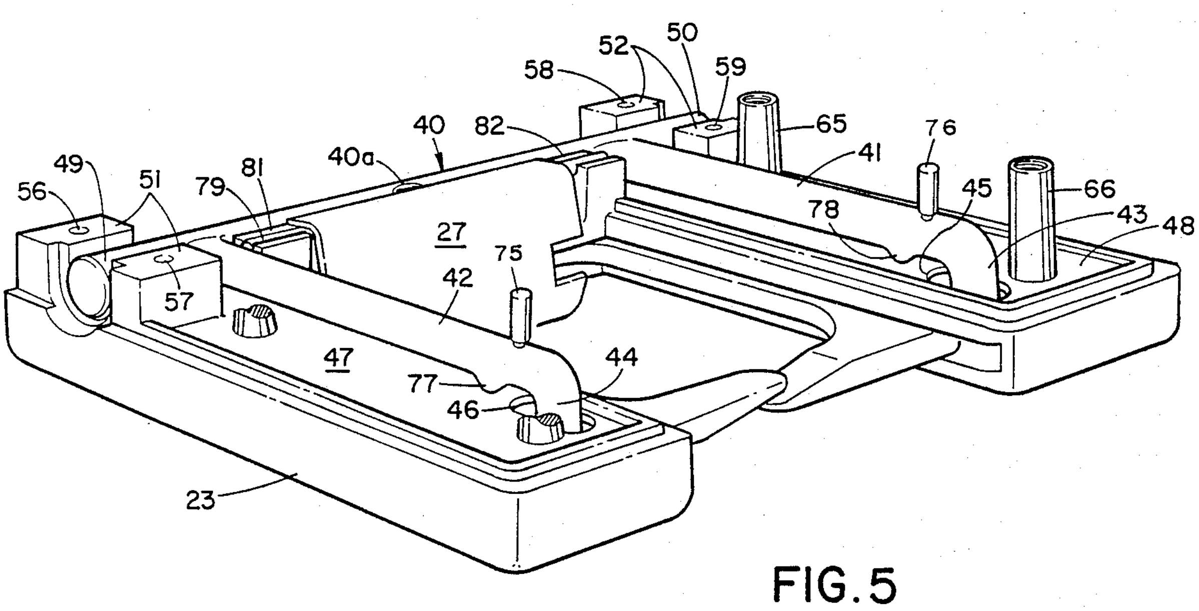
FIG. 5 is a perspective view of the device with the housing sections and the cover plate removed. The release actuating arm has also been removed. The device is shown in the locked condition.
Figure 6:
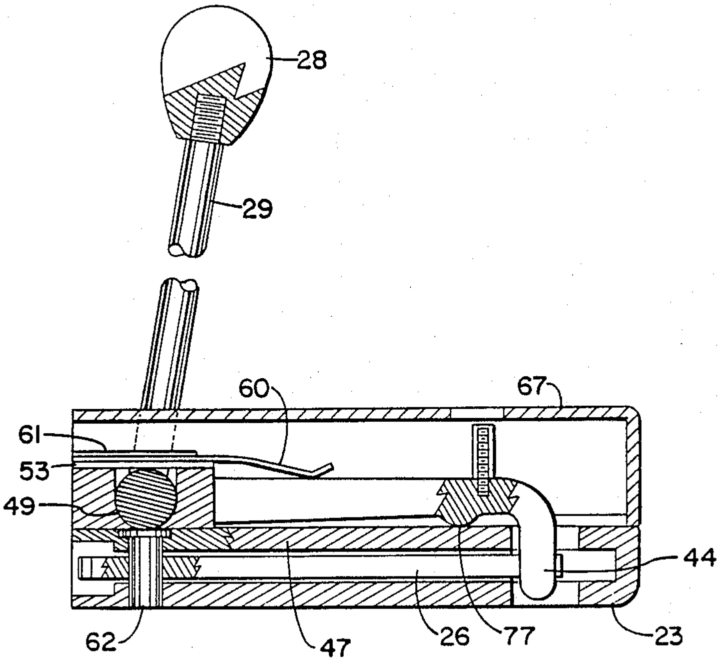
FIG. 6 is a section on a somewhat offset vertical plane perpendicular to the axis or pivotal mounting of the locking member, showing the locked condition.
Figure 7:
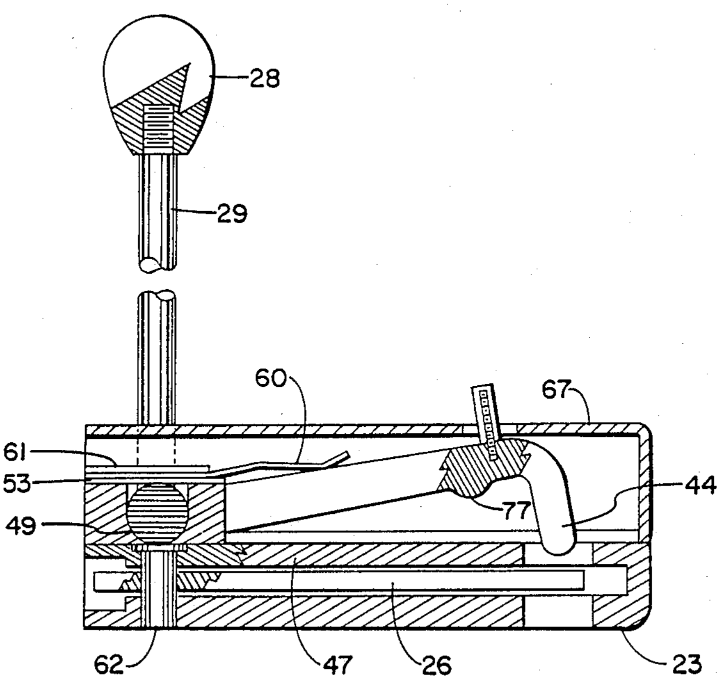
FIG. 7 is a view similar to FIG. 6, showing the unlocked condition.

Referring to FIG. 5, the back of the U-shaped locking member 40 has journal portions 49 and 50 received in the half-bearings 51 and 52 provided by the frame 23. A cover plate 53 bridges across the back of the frame 23, resting on the abutments providing the half-bearings 51 and 52, and is secured to the top surface of these abutments by screws as shown at 54 and 55 in FIG. 4, and 55*a* in FIGS. 2 and 3, engaging tapped holes 56–59 appearing in FIG. 5. The back of the locking member 40 has a tapped hole 40*a* receiving the threaded end of the handle arm 29, which traverses the clearance opening 53*a* in the cover plate. Referring to FIGS. 2, 3, 6, and 7, the cover plate carries two sets of leaf springs 60 disposed to bear, respectively, on the arms 41 and 42 of the locking member. Each of the sets of springs 60 is preferably composed of at least two thin members of leaf spring material, in order to obtain a suitable spring constant within the dimensional limitations. The two strips are placed one on top of the other, and held in place by a pressure plate 61 preferably riveted to the cover plate 53. The leaf springs function to bias the locking member in a clockwise direction, as viewed in FIGS. 6 and 7. The locking member is held in the unlocked position by the presence of the jaws underneath the offset ends, until the actuation of the jaws by the plate 27 to swing them into the closed position of FIG. 3. FIG. 7 shows the locking member over-actuated somewhat in a counter-clockwise direction so that clearance appears between the ends of the locking member and the jaws. This is the situation that would normally occur as a substantial force was applied to the knob 28. Rotation of the jaws takes place about the pivot pins 62, which traverse the holes 37 and 38 in the frame (refer to FIG. 13) and the holes 31 in the jaws (refer to FIG. 11).

The frame has pedestals 63–66 extending upward from the partitions 47 and 48 to support and secure the plastic housing sections 67 and 68. The rather complex configuration of the frame that provides not only these pedestals, but also the abutments establishing the half-bearings for the locking member, is best provided by an integral steel casting. The housing sections, however, are not subject to stress of any significance, and may be of light construction. These sections are secured to the pedestals by screws as shown at 69–72 in FIG. 4. The housing sections have openings 73 and 74 that are traversed by the indicating studs 75 and 76 when the coupling is in the unlocked condition. Preferably, these studs are colored a bright red as a warning signal, and extend well above the top of the housing sections in the FIG. 2 position. In the locked position shown at FIG. 3, these warning projections retract into the space inside the housing sections. The "down" position of the locking arms in this locked position is limited by the engagement of the protuberances 77 and 78 with the top of the partitions 47 and 48, as shown best in FIG. 6. Since the arms cannot assume this position unless the jaws are fully locked, any unlocked condition will result in the appearance of the warning studs above the housing, since the presence of the jaws underneath the offset ends of the locking member will maintain the elevated position of the warning projections. The configuration of the locking member is such that this member is best made as an integral steel casting.

Figure 8:
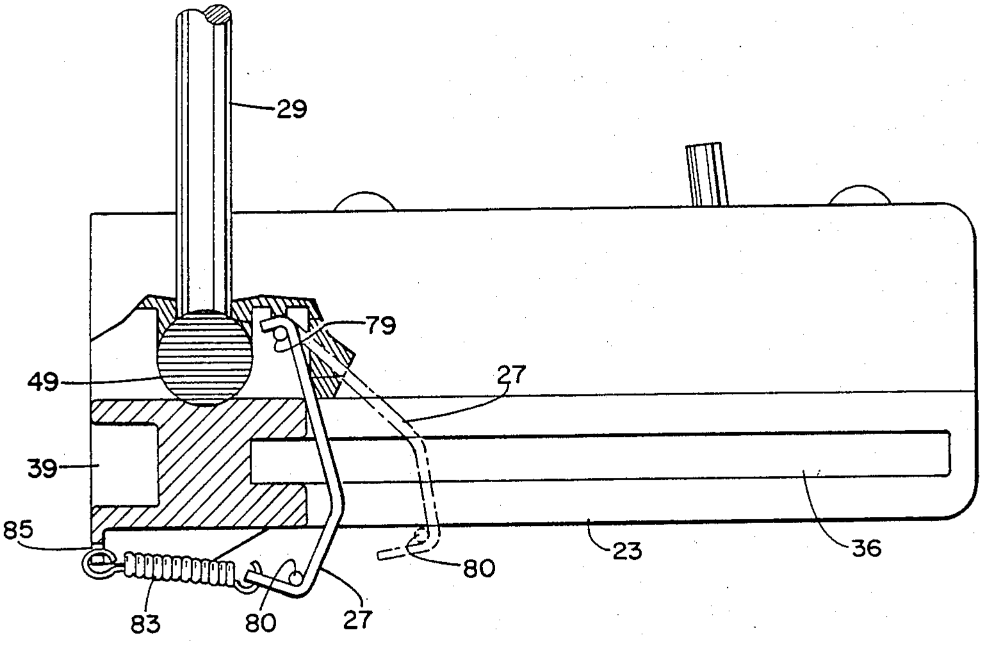
FIG. 8 is a section on an enlarged scale through the central portion of the device on a vertical plane perpendicular to the axis of pivotal mounting of the locking member, particularly illustrating the installation of the actuating plate.
Figure 9:
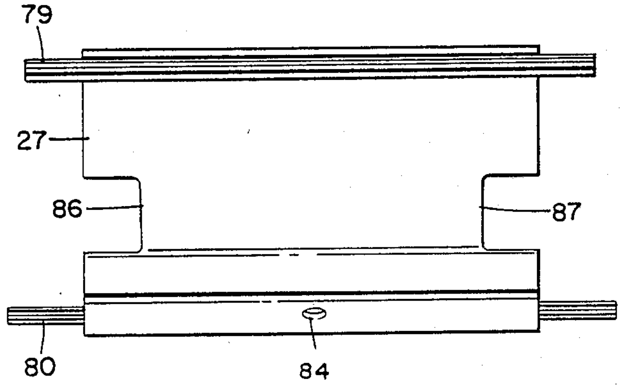
FIG. 9 is a plan view of the actuating plate.
Figure 10:
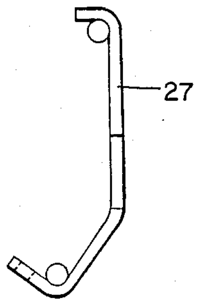
FIG. 10 is a side elevation with respect to FIG. 9.

Referring to FIGS. 8, 9, and 10, the system for swinging the jaws to the locked position centers in the actuator plate 27. This is preferably a piece of cold-rolled steel blanked and bent to the illustrated configuration, with the rods 79 and 80 spot-welded in position. The ends of the rod 79 form journals received in the half-bearings 81 and 82 formed in the frame (refer to FIG. 5). These half-bearings are also closed by the cover plate 53 to provide a complete pivot mounting for the actuator plate. This plate bears against the lever portions 32 of the jaws, and is held there gently by the action of the tension spring 83 extending from its point of connection to the actuator plate at the hole 84 over to the point where it is hooked into the frame at the hole 85. The opposite ends of the rod 80 are engageable with the bottom of the frame, as shown in FIG. 8, to form a stop to the swinging movement of the actuator plate in the counter-clockwise direction. The cut-out areas 86 and 87 on the plate provide clearance for the jaw movement. The device is supported for performing these functions by the engagement of mounting bolts (not shown) with the tapped holes 88 and 89 appearing in FIG. 4. Bolts engaging these holes will normally traverse the seat bottom 21 shown in FIG. 1, together with sufficient solid structure of the seat to resist the forces involved in securing the wheelchair in place.

I claim:

1. A coupling assembly for releasably retaining a wheelchair in position on a vehicle, said assembly including:

a. a U-shaped frame defining a gap, b. a pair of opposite and substantially coplanar L-shaped jaws pivotally mounted on said frame on spaced parallel axes, said jaws being adapted to move between a locking position closing said gap and an open position providing space between said jaws in said gap, c. lever portions on said jaws, and an actuating plate movably mounted on said frame in said gap and adapted to bear on said lever portions to rotate said jaws to said open position, d. a locking member movably mounted on said frame, and adapted to move between a position securing said jaws in locking position to a position releasing said jaws for movement to said open position, e. jaw-biasing means urging said jaws to open position, and f. lock-biasing means urging said locking member to locking position, wherein the improvement comprises:

means on said frame forming coaxial locking member bearing means, said locking member having journal means received in said bearing means, and also having radial arms provided with offset ends disposed to intercept said jaws in the locking position thereof.

2. An assembly as defined in claim 1, wherein said bearing means is an open recess in said frame, and additionally including a cover plate normally secured to said frame and confining said journal means.

3. An assembly as defined in claim 2, wherein said lock biasing means is a leaf spring secured to said cover plate and engaging at least one of said radial arms.

4. An assembly as defined in claim 2, wherein said frame additionally has actuator bearing recesses on an axis parallel to said locking member bearing means axis, and said actuator plate has journal means normally engaging said latter bearing means, said cover plate normally confining said latter journal means.

5. An assembly as defined in claim 4, wherein said actuator plate extends from said actuator bearing means through said gap and beyond the opposite side of said frame from said bearing means, and has at least one lateral extension engagable with said opposite side to limit rotation of said actuator plate.

6. An assembly as defined in claim 1, additionally including housing means secured to said frame and defining a space receiving said radial arms, at least one of said arms having indicator means extending perpendicularly thereto, said housing having an opening traversed by said indicator means in the unlocking position of said locking means.

7. An assembly as defined in claim 1, additionally including a handle arm extending radially from said journal means, said cover plate having a clearance opening traversed by said handle arm.

8. An assembly as defined in claim 7, wherein movement of said handle arm in a direction away from said gap induces movement of said locking member to release said jaws to move to the unlocked position thereof.

9. An assembly as defined in claim 1, wherein said frame is an integral cast member defining an interior space receiving said jaws, and said jaw-biasing means is a tension spring extending between attachment points on said jaws remote from the pivot axis thereof, said frame having an opening into said interior space providing access for installation of said tension spring.

10. A coupling assembly for releasably retaining a wheel chair in position on a vehicle, said assembly including a frame, jaw means mounted on said frame for movement between open and closed positions, locking means mounted on said frame for movement between a first position securing said jaw means in closed position, and a second position releasing said jaws for movement to said open position, and also including housing means normally secured to said frame and enclosing said locking means, wherein the improvement comprises:

indicator means secured to said locking means, said housing means having an opening, and said indicator means being disposed to traverse said opening in said second position, and retract into said housing in said first position.

11. An assembly as defined in claim 10, wherein said frame has a U-shaped configuration defining a gap and a closed end, and said jaw means is operative to close said gap in the closed position thereof, and said locking means is pivoted on said frame at said closed end, said housing opening being adjacent the opposite end of said frame on the top of said housing means.

* * * * *